United States Patent [19]

Primeaux, II

[11] Patent Number: 5,442,034

[45] Date of Patent: Aug. 15, 1995

[54] SPRAY POLYUREA ELASTOMERS CONTAINING ORGANIC CARBONATES TO IMPROVE PROCESSING CHARACTERISTICS

[75] Inventor: Dudley J. Primeaux, II, Elgin, Tex.

[73] Assignee: Huntsman Corporation, Salt Lake City, Utah

[21] Appl. No.: 252,031

[22] Filed: Jun. 1, 1994

[51] Int. Cl.$^6$ .................... C08G 18/10; C08G 18/30
[52] U.S. Cl. ........................ 528/60; 528/68; 528/76; 528/77; 521/130; 521/163; 521/164; 264/328.1; 264/328.2
[58] Field of Search .............. 528/60, 68, 76, 77; 521/130, 163, 164; 264/328.1, 328.2

[56] References Cited

U.S. PATENT DOCUMENTS

| | | | |
|---|---|---|---|
| 3,883,466 | 5/1975 | Olstowski | 260/322 |
| 4,000,105 | 12/1976 | Olstowski | 260/31.2 N |
| 4,154,716 | 5/1979 | Olstowski et al. | 260/37 N |
| 4,530,941 | 7/1985 | Turner et al. | 521/176 |
| 4,709,002 | 11/1987 | Younes | 528/53 |
| 4,731,427 | 3/1988 | Younes | 528/53 |
| 4,748,192 | 5/1988 | Smith | 521/107 |
| 4,883,854 | 11/1989 | Coury et al. | 528/28 |
| 5,028,635 | 7/1991 | Nodelman | 521/130 |
| 5,082,917 | 1/1992 | Su et al. | 528/68 |
| 5,162,388 | 11/1992 | Primeaux, II | 521/159 |
| 5,171,818 | 12/1992 | Wilson | 528/59 |
| 5,175,231 | 12/1992 | Rappoport et al. | 528/156 |

OTHER PUBLICATIONS

D. J. Primeaux, II, "Spray Polyurea Versatile High Performance Elastomer for the Polyurethane Industry," *Polyurethanes 89*, Proceedings of the SPI 32nd Annual Technical/Marketing Conference, 1989, pp. 126–130.

D. J. Primeaux, II, "Spray Polyurea Elstomers Offer Superior Performance," *UTECH '90*, Netherlands Congress Centre, Apr. 3–5, 1990, pp. 189–194.

"Polyurea Spray Formulations Based on Aliphatic Isocyanates and Chain Extenders," *Technical Bulletin*, Texaco Chemical Company, 1990.

D. J. Primeaux, II, "Spray Polyurea Elastomers Offer Performance Advantages", *Modern Paint and Coatings*, Jun. 1991.

D. J. Primeaux, II, "100% Solids Aliphatic Spray Polyurea Elastomer Systems," *Polyurethanes World Congress 1991*, Proceedings of the SPI/ISOPA, 1991, pp. 473–477.

D. J. Primeaux, II, "The Processing of Spray Polyurea Elastomer Systems", *Polyurethanes 92*, Proceedings of the SPI 34th Annual Technical/Marketing Conference, 1992, pp. 598–604.

D. J. Primeaux, II, et al., "Processing Polyurea Elastomers Systems —A Spray Equipment Approach," *UTECH '92*, Netherlands Congress Centre, Mar. 31–Apr. 2, 1992, pp. 173–176.

D. J. Primeaux, II, "100% Solids Aliphatic Spray Polyurea Elastomer Systems," *Journal of Elastomers and Plastics*, vol. 24, Oct. 1992, pp. 323–336.

*Primary Examiner*—Paul R. Michl
*Assistant Examiner*—D. Truong
*Attorney, Agent, or Firm*—Russell R. Stolle; David L. Mossman

[57] ABSTRACT

Spray polyurea elastomers are disclosed made from an (A) component and a (B) component, where the (A) component has a quasi-prepolymer made from an isocyanate and an active hydrogen-containing material, such as a polyoxyalkylenepolyamine. The (B) component includes an amine resin, such as an amine-terminated polyoxyalkylene polyol which may be the same or different from the polyoxyalkylene polyamine of the quasi-prepolymer. The viscosity of the (A) component is reduced by the inclusion of an organic, alkylene carbonate, such as ethylene carbonate, propylene carbonate, butylene carbonate, dimethyl carbonate, and the like. The alkylene carbonate also serves as a compatibilizer between between the two components, thus giving an improved mix of the system.

20 Claims, No Drawings

SPRAY POLYUREA ELASTOMERS CONTAINING ORGANIC CARBONATES TO IMPROVE PROCESSING CHARACTERISTICS

FIELD OF THE INVENTION

The invention relates to aliphatic and aromatic spray polyurea elastomers and processes for making the same, and, in one aspect, more particularly to methods for making aliphatic and aromatic spray polyurea elastomers containing organic carbonates.

BACKGROUND OF THE INVENTION

Spray elastomer systems are commonly recognized as coating materials, with aliphatic and aromatic spray polyurea elastomer systems being particularly useful when employed in this capacity. This two-component technology is based on an isocyanate quasi-prepolymer and an amine coreactant, often an amine resin blend. Typically, the isocyanate quasi-prepolymer is higher in viscosity than the amine resin blend. This difference in viscosity, coupled with the fast reaction characteristics of these systems, can lead to processing problems in thin film applications.

For example, it would be desirable to provide a spray elastomer system where the viscosity of the isocyanate quasi-prepolymer could be lowered. Further, it would be advantageous if such a system would permit the two components to combine more readily to quickly provide a homogeneous mixture.

There is considerable published literature on the topic of polyurea elastomers. For example, see U.S. Pat. No. 5,162,388 to Dudley J. Primeaux, II, which discusses aliphatic polyurea elastomers having an (A) component and a (B) component. The (A) component includes an aliphatic isocyanate, while the (B) component includes an amine-terminated polyoxyalkylene polyol and a chain extender. The chain extender may include cis-1,4-diaminocyclohexane, isophoronediamine, m-xylenediamine, 4,4'-methylenedicyclohexylamine, methanediamine, 1,4-diaminoethylcyclohexane and substituted derivatives thereof.

SUMMARY OF THE INVENTION

Accordingly, it is an object of the present invention to provide an aliphatic and aromatic spray polyurea elastomer where the isocyanate quasi-prepolymer component has reduced viscosity from that known before.

It is another object of the present invention to provide an aliphatic and/or aromatic spray polyurea elastomer where the agent that provides for reduced viscosity of the isocyanate component also acts as a compatibilizer between the two components to improve the mix of components and homogeneity of the system.

A particular object of the invention is to provide an aliphatic and/or aromatic spray polyurea elastomer with the above characteristics and which has good physical properties including good surface characteristics.

In carrying out these and other objects of the invention, there is provided, in one form, a spray polyurea elastomer having an (A) component which includes a quasi-prepolymer of an isocyanate and an active hydrogen-containing material; together with an alkylene carbonate. To make the elastomer, the (A) component is reacted with the (B) component which has at least one amine-terminated polyoxyalkylene polyol. In one embodiment of the invention, the (B) component is an amine resin blend.

DETAILED DESCRIPTION OF THE INVENTION

It has been discovered that the addition of an organic, alkylene carbonate, such as TEXACAR ® PC or TEXACAR EC-50, to the isocyanate quasi-prepolymer of the (A) component, will result in a lower viscosity component. The carbonate also functions as a compatibilizer between the two components, which gives an improved mix and increased homogeneity of the system. This lower viscosity and improved mix allows for paint-type application of the aliphatic and/or aromatic spray polyurea technology.

The aliphatic and/or aromatic spray polyurea elastomer system of the present invention generally includes two components, an (A) component and a (B) component. In particular, the (A) component may include an aliphatic isocyanate. The aliphatic isocyanates employed in component (A) are those known to one skilled in the art. Thus, for instance, the aliphatic isocyanates are of the type described in U.S. Pat. No. 4,748,192, incorporated by reference herein. Accordingly, they are typically aliphatic diisocyanates, and more particularly are the trimerized or the biuretic form of an aliphatic diisocyanate, such as, hexamethylene diisocyanate, or the bifunctional monomer of the tetraalkyl xylene diisocyanate, such as the tetramethyl xylene diisocyanate. Cyclohexane diisocyanate is also to be considered a preferred aliphatic isocyanate. Other useful aliphatic polyisocyanates are described in U.S. Pat. No. 4,705,814, also incorporated by reference herein. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers, 1-isocyanato-3,3,5-trimethyl-5-isocyanatomethylcyclohexane (isophorone diisocyanate); 4,4'-, 2,2'- and 2,4'-dicyclohexylmethane diisocyanate as well as the corresponding isomer mixtures, and the like.

Aromatic isocyanates may also be employed. Suitable aromatic polyisocyanates include, but are not necessarily limited to, m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; diphenylene-4,4'-diisocyanate; and the like. Aliphatic/aromatic diisocyanates, such as xylylene-1,3-diisocyanate; bis(4-isocyanatophenyl)methane; bis(3-methyl-4-isocyanatophenyl)methane; and 4,4'-diphenylpropane diisocyanate. The aforestated isocyanates can be used alone or in combination.

In the practice of the present invention, it is expected that the isocyanate will be at least partially reacted with an active hydrogen-containing material. The alkylene carbonates of this invention may be added to an (A) component having only a un-prereacted isocyanate therein, that is, not at least partially reacted with an active hydrogen-containing material to form a quasi-prepolymer. In such a case, the carbonates would work as a reactive diluent. However, it is anticipated that the alkylene carbonates will find a greater utility in the situation where the (A) component contains a quasi-prepolymer of a relatively high viscosity which may be lowered by the alkylene carbonate.

The active hydrogen-containing materials may include, but are not necessarily limited to polyols or high molecular weight polyoxyalkyleneamines, also described herein as amine-terminated polyethers, or a combination thereof.

The polyols include, but are not necessarily limited to, polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl-terminated rubbers, e.g., hydroxyl-terminated polybutadiene. Hydroxyl-terminated quasi-prepolymers of polyols and isocyanates are also useful in this invention.

Especially preferred are amine-terminated polyether polyols, including primary and secondary amine-terminated polyether polyols of greater than 1,500 average molecular weight having from about 2 to about 6 functionality, preferably from about 2 to about 3, and an amine equivalent weight of from about 750 to about 4,000. Mixtures of amine-terminated polyethers may be used. In a preferred embodiment, the amine-terminated polyethers have an average molecular weight of at least about 2,500. These materials may be made by various methods known in the art.

The amine-terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl-terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine-terminated polyether resins useful in this invention have greater than 50 percent of their active hydrogens in the form of amine hydrogens. If ethylene oxide is used, it is desirable to cap the hydroxyl-terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which are incorporated by reference herein.

In the practice of this invention, a single high molecular weight amine-terminated polyol may be used. Also, mixtures of high molecular weight amine-terminated polyols, such as mixtures of di- and trifunctional materials and/or different molecular weight or different chemical composition materials, may be used.

Also, high molecular weight amine-terminated polyethers or simply polyether amines are included within the scope of my invention and may be used alone or in combination with the aforestated polyols. The term "high molecular weight" is intended to include polyether amines having a molecular weight of at least about 2000. Particularly preferred are the JEFFAMINE® series of polyether amines available from Huntsman Corporation; they include JEFFAMINE D-2000, JEFFAMINE D-4000, JEFFAMINE T-3000 and JEFFAMINE T-5000.

As noted, the (A) component of the present spray polyurea elastomer systems include an organic alkylene carbonate. The alkylene carbonate may have the structure (1):

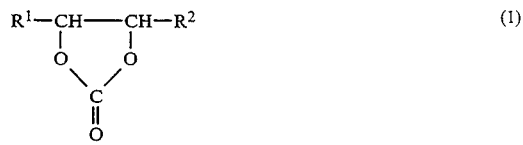

where $R^1$ and $R^2$ are independently hydrogen or lower alkyl of 1 to 4 carbon atoms. In a particular embodiment of the invention, the alkylene carbonates are preferably chosen from the group of ethylene carbonate, propylene carbonate, butylene carbonate and dimethyl carbonate.

In one embodiment of the invention, the proportion of alkylene carbonate in (A) component ranges from about 1 to about 20 percent, preferably from about 5 to 15 percent and most preferably from about 5 to 10 percent. These percentages are based on 100 volume parts in the (A) component. The use of the alkylene carbonates reduces the viscosity of the (A) component, allows slower effective reactivities in spray polyurea elastomer systems, improved properties and surface characteristics (flowability) and possibly improved adhesion to the surfaces on which the elastomer is sprayed. The polyurea elastomers of the invention can be used as protective coatings, in "paint" applications, membranes, barrier coatings, road marking coatings, decorative coatings, automotive instrument panel applications, and the like.

The polyurea elastomer systems may also include chain extenders in the formulation, preferably within the (B) component. Suitable chain extenders include those aliphatic and cycloaliphatic diamine chain extenders mentioned in U.S. Pat. No. 5,162,388 and patent application Ser. No. 08/117,962, incorporated herein by reference. Aromatic diamine chain extenders may also be useful.

Other conventional formulation ingredients may be employed in component (A) or (B) as needed, such as, for example, foam stabilizers, also known as silicone oils or emulsifiers. The foam stabilizers may be an organic silane or siloxane. For example, compounds may be used having the formula:

$$RSi[O-(R_2SiO)_n\text{-(oxyalkylene)}_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773, incorporated by reference herein. Pigments, for example titanium dioxide, may be incorporated in the elastomer system, preferably in the (B) component, to impart color properties to the elastomer.

Reinforcing materials, if desired, useful in the practice of the invention are known to those skilled in the art. For example, chopped or milled glass fibers, chopped or milled carbon fibers and/or other mineral fibers are useful.

Post curing of the elastomer of the invention is optional. Post curing will improve some elastomeric properties, such as heat sag. Employment of post curing depends on the desired properties of the end product. The (A) component and (B) component of the present spray polyurea elastomer system are combined or mixed under high pressure; most preferably, they are impingement mixed directly in the high pressure spray equipment. In particular, a first and second pressurized stream of components (A) and (B), respectively, are delivered from two separate chambers of the proportioner and are impacted or impinged upon each other at high velocity to effectuate an intimate mixing of the two components and, thus, the formulation of the elastomer system, which is then coated onto the desired substrate via the spray gun.

The volumetric ratio of the (A) component to the (B) component is generally from about 30 to 70 percent to about 70 to 30 percent. Preferably, component (A) and component (B) are employed in a 1:1 volumetric ratio.

Advantageously, the (A) and (B) components react to form the present elastomer system without the aid of a catalyst.

The following Examples are provided to further illustrate the preferred embodiments of the present invention, but should not be construed as limiting the present invention in any way.

Spray Work

For all the spray work described in these Examples, a GUSMER® VR-H-3000 Proportioning unit (plural component) was used, fitted with a GUSMER GX-7-400 spray gun. The equipment was set so as to process each example at an isocyanate to resin blend volume ratio of 1.00. Spray processing pressures were maintained at 1500 psi to 2500 psi on both the isocyanate and resin blend components. Block heat, as well as hose heat, was set at 160° F.

EXAMPLE I

This spray polyurea application used a system with the A-Component, a quasi-prepolymer of m-TMXDI®, 54.5 parts; and JEFFAMINE® D-2000, 36.4 parts. To this quasi-prepolymer, 9.1 parts of TEXACAR® PC (propylene carbonate) was added, all collectively referred to as the isocyanate component. The isocyanate component was reacted with a B-component (amine resin blend), a blend of JEFFAMINE T-5000, 24.9 parts; JEFFAMINE D-2000, 24.9 parts; JEFFAMINE T-403, 18.7 parts; JEFFAMINE D-230, 27.4 parts; and TiPure® R-900 (titanium dioxide), 4.1 parts. These components were mixed at a volume ratio of 1.00 (1.00 weight ratio) with high pressure, high temperature impingement mix spray equipment. The resulting aliphatic polyurea elastomer had an effective gel time of 2.0 seconds with a tack free time of approximately 10 seconds. Formulation and elastomer physical properties are detailed in Table I. This system was easily applied to a metal substrate with a uniform elastomer film thickness of 5 mils (0.005 inches).

EXAMPLE II

This Example used a system with the same A-Component (isocyanate quasi-prepolymer component) as mentioned in Example I. The B-component used was a blend of JEFFAMINE T-5000, 22.8 parts; JEFFAMINE D-2000, 22.8 parts; JEFFAMINE T-403, 17.1 parts; JEFFAMINE D-230, 27.4 parts; and TiPure® R-900, 9.9 parts. These components were mixed at a volume ratio of 1.00 (1.00 weight ratio) using the same spray equipment in Example I. The resulting aliphatic polyurea elastomer had an effective gel time of 2.0 seconds with a tack free time of approximately 10 seconds. Formulation and elastomer physical properties are detailed in Table I. This system was easily applied to a metal substrate with a uniform elastomer film thickness of 5 mils (0.005 inches).

COMPARATIVE EXAMPLE III

For comparison, this Example used a system with an A-Component (isocyanate quasi-prepolymer component) of composition: a quasi-prepolymer of m-TMXDI, 55 parts; and JEFFAMINE D-2000, 45 parts, with no alkylene carbonate. The B-component used was a blend of JEFFAMINE T-5000, 19.25 parts; JEFFAMINE D-2000, 28.87 parts; JEFFAMINE T-403, 22.86 parts; JEFFAMINE D-230, 22.86 parts; and Ti-Pure R-900, 6.16 parts. These components were mixed at a volume ratio of 1.00 (1.00 weight ratio) using the same spray equipment in Examples I and II. The resulting aliphatic polyurea elastomer had an effective gel time of 1.5 seconds with a tack free time of less than 5 seconds. Formulation and elastomer physical properties are described in Table I. The minimum uniform film thickness obtainable was 25 mils (0.025 inches).

COMPARATIVE EXAMPLE IV

Again, for comparison, this Example used a system with the same A-Component (isocyanate quasi-prepolymer component) as described in Example III. The B-component used was a blend of JEFFAMINE T-5000, 27.0 parts; JEFFAMINE D-2000, 27.0 parts; JEFFAMINE T-403, 17.6 parts; and JEFFAMINE D-230, 28.4 parts. These components were mixed at a volume ratio of 1.00 (1.00 weight ratio) using the same spray equipment in Examples I, II, and III. Reactivity of this system was similar to that of Example III. Formulation and elastomer physical properties are mentioned in Table I. The minimum uniform film thickness obtainable was 25 mils (0.025 inches).

TABLE I

| Elastomer Physical Properties for Examples I–IV | | | | |
|---|---|---|---|---|
| | Example | | | |
| | I | II | III | IV |
| Isocyanate quasi-prepolymer | | | | |
| m-TMXDI | 54.5 | 54.5 | 55.0 | 55.0 |
| JEFFAMINE D-2000 | 36.4 | 36.4 | 45 | 45 |
| TEXACAR PC | 9.1 | 9.1 | — | — |
| NCO, % | 16.8 | 16.8 | 16.6 | 16.6 |
| Resin blends | | | | |
| JEFFAMINE T-5000 | 24.9 | 22.8 | 19.25 | 27.0 |
| JEFFAMINE D-2000 | 24.9 | 22.8 | 28.87 | 27.0 |
| JEFFAMINE T-403 | 18.7 | 17.1 | 22.86 | 17.6 |
| JEFFAMINE D-230 | 27.4 | 27.4 | 22.86 | 28.4 |
| TiPure R-900 | 4.1 | 9.9 | 6.16 | — |
| Processing | | | | |
| INDEX | 1.05 | 1.05 | 1.05 | 1.05 |
| Iso/Resin vol. ratio | 1.00 | 1.00 | 1.00 | 1.00 |
| Effective gel time, sec. | 2.0 | 2.0 | 1.5 | 1.5 |
| Tack free, sec. | 10 | 10 | <5 | <5 |
| Physical Properties | | | | |
| Tensile strength, psi | 1200 | 2035 | 1415 | 1250 |
| Elongation, % | 475 | 535 | 400 | 395 |
| Tear strength, pli | 205 | 335 | 260 | 285 |

TABLE I-continued

Elastomer Physical Properties for Examples I–IV

| | Example | | | |
|---|---|---|---|---|
| | I | II | III | IV |
| Shore D Hardness | 35 | 45 | 40 | 42 |
| 100% Modulus, psi | 525 | 835 | 665 | 635 |
| 300% Modulus, psi | 775 | 1225 | 1110 | 945 |

It may be seen that the physical properties of the elastomers of Examples I and II are the about the same as or improved over the elastomers Comparative Examples III and IV. The elastomers containing propylene carbonate also had improved processing characteristics, as noted.

EXAMPLES V, VI & VII

For additional illustration, three systems were prepared utilizing cycloaliphatic diamine chain extenders as well as the low molecular weight polyetheramines. These Examples used the same isocyanate component given in Examples I and II, above. Formulation and elastomer physical property information is shown in Table II.

TABLE II

Elastomer Physical Properties for Examples V–VII

| | Example | | |
|---|---|---|---|
| | V | VI | VII |
| Isocyanate quasi-prepolymer | | | |
| m-TMXDI | 54.5 | 54.5 | 54.5 |
| JEFFAMINE D-2000 | 36.4 | 36.4 | 36.4 |
| TEXACAR PC | 9.1 | 9.1 | 9.1 |
| NCO, % | 16.8 | 16.8 | 16.8 |
| Resin blends | | | |
| JEFFAMINE T-5000 | 24.0 | 32.8 | 25.1 |
| JEFFAMINE D-2000 | 24.0 | 32.8 | — |
| JEFFAMINE T-403 | — | — | 37.6 |
| JEFFAMINE D-230 | 19.2 | — | — |
| VESTAMIN ® IPD | — | 30.3 | 5.0 |
| XTA-110 | — | — | 28.2 |
| TiPure R-900 | 4.0 | 4.1 | 4.1 |
| Processing | | | |
| INDEX | 1.05 | 1.05 | 1.05 |
| Iso/Resin vol. ratio | 1.00 | 1.00 | 1.00 |
| Effective gel time, sec. | 2.0 | 2.0 | 3.0 |
| Tack free, sec. | 10 | 10 | 10 |
| Physical Properties | | | |
| Tensile strength, psi | 895 | 1545 | 1400 |
| Elongation, % | 395 | 330 | 170 |
| Tear strength, pli | 230 | 345 | 210 |
| Shore D Hardness | 34 | 41 | 41 |
| 100% Modulus, psi | 690 | 1255 | 1035 |
| 300% Modulus, psi | 815 | 1415 | — |

EXAMPLE VIII

This Example used an isocyanate component, (A) component, of a blend of AIRTHANE ® XACP-722, 45.45 parts; AIRTHANE XACP-504, 45.45 parts; and TEXACAR PC, 9.1 parts. This resulting isocyanate component had a viscosity of 1000 to 1300 cps, as compared to well over 20,000 cps without the TEXACAR PC, making it processable. The (B) component used was a blend of JEFFAMINE T-5000, 35.1 parts; JEFFAMINE D-2000, 52.6 parts, VESTAMIN IPD, 7.2 parts; and TiPure R-900, 5.1 parts. These components were mixed at a volume ratio of 1.00 (1.00 weight ratio) using the same spray equipment mentioned in previous Examples. Formulation and elastomer physical property information are seen in Table III.

TABLE III

Elastomer Physical Properties for Example VIII

| | Example VIII |
|---|---|
| Isocyanate quasi-prepolymer | |
| AIRTHANE XACP-722 | 45.45 |
| AIRTHANE XACP-504 | 45.45 |
| TEXACAR PC | 9.1 |
| NCO, % | 6.4 |
| Resin blends | |
| JEFFAMINE T-5000 | 35.1 |
| JEFFAMINE D-2000 | 52.6 |
| VESTAMIN IPD | 7.2 |
| TiPure R-900 | 5.1 |
| Processing | |
| INDEX | 1.05 |
| Iso/Resin vol. ratio | 1.00 |
| Effective gel time, sec. | 3.0 |
| Tack free, sec. | >1 hr. |
| Physical Properties | |
| Tensile strength, psi | 690 |
| Elongation, % | 300 |
| Tear strength, pli | 90 |
| Shore D Hardness | 39 |
| 100% Modulus, psi | 375 |
| 300% Modulus, psi | 46 |

EXAMPLES IX, X, XI, XII & XIII

These Examples illustrate the use of TEXACAR EC-50 in the isocyanate component. The elastomers will be processed as Examples I, II, V, VI and VII. Based on previous experiences, these Examples should exhibit the same characteristics as before. Formulation information is presented in Table IV.

TABLE IV

Elastomer Physical Properties for Examples IX–XIII

| | Examples | | | | |
|---|---|---|---|---|---|
| | IX | X | XI | XII | XIII |
| Isocyanate quasi-prepolymer | | | | | |
| m-TMXDI | 54.5 | 54.5 | 54.5 | 54.5 | 54.5 |
| JEFFAMINE D-2000 | 36.4 | 36.4 | 36.4 | 36.4 | 36.4 |
| TEXACAR EC-50 | 9.1 | 9.1 | 9.1 | 9.1 | 9.1 |
| NCO, % | 16.8 | 16.8 | 16.8 | 16.8 | 16.8 |
| Resin blends | | | | | |
| JEFFAMINE T-5000 | 24.9 | 24.9 | 22.8 | 5.1 | 5.0 |
| JEFFAMINE D-2000 | 24.9 | — | 22.8 | 58.1 | 53.6 |
| JEFFAMINE D-4000 | — | 24.0 | — | — | — |
| JEFFAMINE T-403 | 18.7 | 19.2 | 17.1 | — | — |
| JEFFAMINE D-230 | 27.4 | 28.8 | 27.4 | — | — |
| VESTAMIN IPD | — | — | — | 26.9 | — |
| XTA-100 | — | — | — | — | 31.5 |
| TiPure R-900 | 4.1 | 4.0 | 9.9 | 9.9 | 9.9 |
| Processing | | | | | |
| INDEX | 1.05 | 1.05 | 1.05 | 1.05 | 1.05 |
| Iso/Resin vol. ratio | 1.00 | 1.00 | 1.00 | 1.00 | 1.00 |

EXAMPLES XIV–XIX

These Examples will illustrate the application of the method of this invention to formulations where the isocyanate used in the quasi-prepolymer is an aromatic isocyanate. The results are reported in Table V.

TABLE V

Elastomer Physical Properties for Examples XIV–XIX

| | Example | | | | | |
|---|---|---|---|---|---|---|
| | XIV | XV | XVI | XVII | XVIII | XIX |
| Isocyanate-quasi-prepolymer | | | | | | |
| RUBINATE ® X 9015 | 100 | 90 | — | — | — | — |
| RUBINATE ® X 9009 | — | — | 100 | 90 | — | — |
| MONDUR ® ML | — | — | — | — | 55 | 49.5 |
| TEXOX ® PPG-2000 | — | — | — | — | 45 | 40.5 |
| TEXACAR PC | — | 10 | — | 10 | — | 10 |
| NCO, % | 15.5 | 14.0 | 15.5 | 14.0 | 16.5 | 14.8 |
| Resin blends | | | | | | |
| JEFFAMINE D-2000 | 70.0 | 70.0 | 70.0 | 70.0 | 70.0 | 70.0 |
| ETHACURE ® 100 | 30.0 | 30.0 | 30.0 | 30.0 | 30.0 | 30.0 |
| Processing | | | | | | |
| INDEX | 1.05 | 0.95 | 1.05 | 0.95 | 1.07 | 0.98 |
| Iso/Resin vol. ratio | 1.00 | 1.00 | 1.00 | 1.00 | 1.00 | 1.00 |
| Effective gel time, sec. | 2.6 | 2.9 | 2.6 | 3.4 | 4.4 | 5.5 |
| Physical Properties | | | | | | |
| Tensile strength, psi | 2515 | 2325 | 2730 | 2215 | 2830 | 2230 |
| Elongation, % | 240 | 250 | 220 | 230 | 360 | 405 |
| Tear strength, pli | 435 | 390 | 485 | 395 | 500 | 465 |
| Shore D Hardness | 49 | 52 | 49 | 42 | 48 | 51 |
| 100% Modulus, psi | 1665 | 1540 | 1845 | 1530 | 1475 | 1275 |
| 300% Modulus, psi | — | — | — | — | 2385 | 1865 |

From reviewing Table V, it may be seen that the addition of propylene carbonate to systems of Examples XV, XVII and XIX using aromatic polyisocyanates also lengthens the gel time of the system as compared with the elastomers of Examples XIV, XVI and XVIII. The physical properties of the elastomers using propylene carbonate are about the same as those without.

Many modifications may be made in the process of this invention without departing from the spirit and scope thereof which are defined only in the appended claims. For example, one skilled in the art may discover that particular combinations of components with the alkylene carbonates or proportions therewith may give polyurea elastomers with advantageous properties.

GLOSSARY

AIRTHANE ® XAPC-504 Isocyanate prepolymer of isophorone diisocyanate and a PTMEG polyol, with an equivalent weight of 504 and a functionality of 2.6, viscosity >40,000 cps. A product of Air Products.

AIRTHANE ® XAPC-722 Isocyanate prepolymer of isophorone diisocyanate and a PTMEG polyol, with an equivalent weight of 722 and a functionality of 2.0, viscosity >10,000 cps. A product of Air Products.

ETHACURE ® 100 A diethyltoluenediamine product of Ethyl Corp.

JEFFAMINE ® D-230 An amine-terminated polyoxypropylene diol of 230 molecular weight available from Huntsman Corporation, used as a chain extender.

JEFFAMINE ® D-2000 An amine-terminated polyoxypropylene diol of 2000 molecular weight available from Huntsman Corporation.

JEFFAMINE ® D-4000 An amine-terminated polyoxypropylene diol of 4000 molecular weight available from Huntsman Corporation.

JEFFAMINE ® T-403 An amine-terminated polyoxypropylene triol of 400 molecular weight available from Huntsman Corporation.

JEFFAMINE ® T-5000 An amine-terminated polyoxypropylene triol of 5000 molecular weight available from Huntsman Corporation.

MONDUR ® ML A liquid uretonimine-modified methylenediisocyanate product of Miles, Inc.

m-TMXDI ® m-Tetramethylxylene diisocyanate from Cytec Industries (American Cyanamid).

RUBINATE ® X 9009 An aromatic polyisocyanate quasi-prepolymer made by ICI Polyurethanes.

RUBINATE ® X 9015 An aromatic polyisocyanate quasi-prepolymer made by ICI Polyurethanes.

TEXACAR ® EC-50 A proprietary blend of ethylene and propylene carbonate from Huntsman Corporation.

TEXACAR ® PC Propylene carbonate from Huntsman Corporation.

TEXOX ® PPG-2000 A polypropylene glycol product having a molecular weight of 2000 of Huntsman Corporation.

TiPure ® R-900 Titanium dioxide available from E. I. du Pont de Nemours, Co.

VESTAMIN ® IPD Isophorone diamine from Huls America, used as a chain extender.

XTA-110 Experimental cycloaliphatic diamine of 194 molecular weight from Huntsman Corporation, used as a chain extender.

I claim:

1. A spray polyurea elastomer made by the process comprising the steps of:
   reacting together an isocyanate, and an active hydrogen-containing material to form a quasi-prepolymer;
   mixing an alkylene carbonate with the quasi-prepolymer after the quasi-prepolymer is formed, to produce an (A) component; and
   reacting together the (A) component and a (B) component comprising at least one amine resin by combining the components through a spray gun.

2. The spray polyurea elastomer of claim 1 where in the (B) component the amine resin is an amine-terminated polyoxyalkylene polyol.

3. The spray polyurea elastomer of claim 1 where the (B) component further comprises an amine resin blend having at least two amine-terminated polyoxyalkylene polyols.

4. The spray polyurea elastomer of claim 1 where in the (A) component the alkylene carbonate has the formula

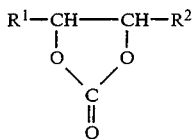

where $R^1$ and $R^2$ are independently hydrogen or lower alkyl groups of 1 to 4 carbon atoms.

5. The spray polyurea elastomer of claim 1 where in the (A) component the alkylene carbonate is selected from the group consisting of ethylene carbonate, propylene carbonate, butylene carbonate, dimethyl carbonate and mixtures thereof.

6. The spray polyurea elastomer of claim 1 where the proportion of alkylene carbonate in the (A) component ranges from about 1 to about 20% of the (A) component.

7. The spray polyurea elastomer of claim 1 where the proportion of alkylene carbonate in the (A) component ranges from about 5 to about 15% of the (A) component.

8. The spray polyurea elastomer of claim 1 where the isocyanate is selected from the group of isocyanates consisting of
    aliphatic isocyanates selected from the group consisting of hexamethylene diisocyanate, a bifunctional monomer of tetraalkyl xylene diisocyanate, cyclohexane diisocyanate, 1,12-dodecane diisocyanate, 1,4-tetramethylene diisocyanate, isophorone diisocyanate, and dicyclohexylmethane diisocyanate;
    aromatic isocyanates selected from the group consisting of m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; and diphenylene-4,4'-diisocyanate; and
    aliphatic/aromatic diisocyanates, selected from the group consisting of xylylene-1,3-diisocyanate; bis(4-isocyanatophenyl)methane; bis(3-methyl-4-isocyanatophenyl)methane; and 4,4'-diphenylpropane diisocyanate;
    and mixtures thereof.

9. The spray polyurea elastomer of claim 1 where the active hydrogen-containing material is selected from the group consisting of a polyol, a polyoxyalkyleneamine or a combination thereof.

10. The spray polyurea elastomer of claim 9 where the active hydrogen-containing material in the (A) component and the amine-terminated polyoxyalkylene polyol in the (B) component, comprise polyether polyols or polyester polyols having an equivalent weight of at least about 500.

11. The spray polyurea elastomer of claim 1 where the (B) component additionally comprises an aliphatic, cycloaliphatic or aromatic diamine chain extender.

12. A spray polyurea elastomer made by the process comprising the steps of:
    reacting together an isocyanate, and an active hydrogen-containing material to form a quasi-prepolymer;
    mixing an alkylene carbonate of the formula:

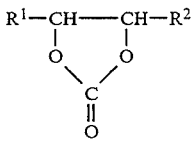

where $R^1$ and $R^2$ are independently hydrogen or lower alkyl groups of 1 to 4 carbon atoms, with the quasi-prepolymer after the quasi-prepolymer is formed, to produce an (A) component, where the proportion of alkylene carbonate in the (A) component ranges from about 1 to about 20% of the (A) component; and
    reacting together the (A) component; and
        a (B) component comprising at least one amine resin, by combining the components through a spray gun.

13. The spray polyurea elastomer of claim 12 where the (B) component further comprises an amine resin blend having at least two amine-terminated polyoxyalkylene polyols.

14. The spray polyurea elastomer of claim 12 where the proportion of alkylene carbonate in the (A) component ranges from about 5 to about 15% of the (A) component.

15. The spray polyurea elastomer of claim 11 where the isocyanate is selected from the group of isocyanates consisting of
    aliphatic isocyanates selected from the group consisting of hexamethylene diisocyanate, a bifunctional monomer of tetraalkyl xylene diisocyanate, cyclohexane diisocyanate, 1,12-dodecane diisocyanate, 1,4-tetramethylene diisocyanate, isophorone diisocyanate, and dicyclohexylmethane diisocyanate,
    aromatic isocyanates selected from the group consisting of m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; and diphenylene-4,4'-diisocyanate; and
    aliphatic/aromatic diisocyanates selected from the group consisting of xylylene-1,3-diisocyanate; bis(4-isocyanatophenyl)methane; bis(3-methyl-4-isocyanatophenyl)methane; and 4,4'-diphenylpropane diisocyanate;
    and mixtures thereof.

16. The spray polyurea elastomer of claim 15 where the active hydrogen-containing material is selected from the group consisting of a polyol, a polyoxyalkyleneamine or a combination thereof.

17. The spray polyurea elastomer of claim 15 where the active hydrogen-containing material in the (A) component and the amine-terminated polyoxyalkylene polyol in the (B) component, comprise polyether polyols or polyester polyols having an equivalent weight of at least about 500.

18. The spray polyurea elastomer of claim 17 where the (B) component additionally comprises an aliphatic, cycloaliphatic or aromatic diamine chain extender.

19. A spray polyurea elastomer made by the process comprising the steps of:
    reacting together an isocyanate, and an active hydrogen-containing material to form a quasi-prepolymer;
    mixing an alkylene carbonate selected from the group consisting of ethylene carbonate, propylene carbonate, butylene carbonate, dimethyl carbonate and mixtures thereof, with the quasi-prepolymer after the quasi-prepolymer is formed, to produce an (A) component where the proportion of alkylene carbonate in the (A) component ranges from about 1 to about 20% of the (A) component; and reacting together the (A) component; and a (B) component comprising an amine resin blend having at least two amine-terminated polyoxyalkylene polyols by combining the components through a spray gun, where the volumetric ratio of the (A) component to the (B) component is from about 30 to 70 percent of the (A) component to about 70 to 30 percent of the (B) component.

20. The spray polyurea elastomer of claim 19 where the active hydrogen-containing material in the (A) component and the amine-terminated polyoxyalkylene polyol in the (B) component, comprise polyether polyols or polyester polyols having an equivalent weight of at least about 500.

* * * * *